Figure 1:
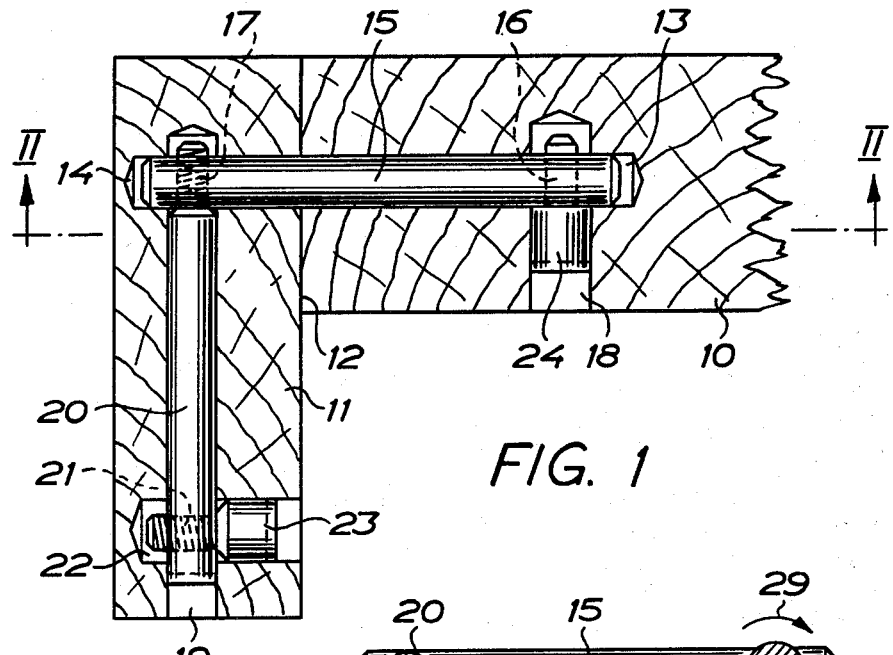

United States Patent [19]

Stockum

[11] 4,405,253
[45] Sep. 20, 1983

[54] CONNECTION BETWEEN TWO ELEMENTS

[76] Inventor: Bernt I. Stockum, Fuxgatan 15, S-212 35 Malmö, Sweden

[21] Appl. No.: 237,166

[22] PCT Filed: Jun. 20, 1979

[86] PCT No.: PCT/SE79/00141
§ 371 Date: Feb. 17, 1981
§ 102(e) Date: Feb. 17, 1981

[87] PCT Pub. No.: WO80/02866
PCT Pub. Date: Dec. 24, 1980

[30] Foreign Application Priority Data

Dec. 20, 1977 [SE] Sweden ............................ 7714487

[51] Int. Cl.³ .................... B25G 3/00; F16B 7/08; F16B 9/00; F16L 41/00
[52] U.S. Cl. .................................. 403/231; 403/408; 312/263
[58] Field of Search ............... 403/230, 231, 409, 408; 312/263, 245

[56] References Cited

U.S. PATENT DOCUMENTS 3,884,002  5/1975  Logie .............................. 312/263 X
4,116,573  9/1978  Fuchs .............................. 403/409 X Primary Examiner—Wayne L. Shedd

[57] ABSTRACT

A connection between two elements (10, 11) in furniture or the like.

A straight rod (15) extends with the two end portions thereof into a bore in one element and the other, respectively. It is locked, by means of a cross-pin (24) in a transverse bore (18) in one element (10) against withdrawal from this element, and it is locked, by means of a cross-rod (20) which has a considerably greater length than the cross-dimension of the straight rod (15) and is received in a transverse bore (19) in the other element (11), against withdrawal from this element. The cross-rod forms one arm of a rigid angle fitting, the other arm of which is formed by the part of the straight rod, extending into said one element (10). The cross-pin (24) is constructed as an eccentric, rendering possible tightening of the elements (10, 11) against one another by means of the straight rod (15).

4 Claims, 6 Drawing Figures

U.S. Patent    Sep. 20, 1983    4,405,253

CONNECTION BETWEEN TWO ELEMENTS

The invention relates to a connection between two elements, preferably elements of wood in furniture or the like, comprising a straight rod the two end portions of which extend into a bore in one element and the other, respectively, and which is locked, by means of a cross-pin in a transverse bore in one element, against withdrawal from this element and is locked, by means of a cross-rod in a transverse bore in the other element, against withdrawal from this element.

Various types of furniture fitting have been proposed in an effort to provide connections of this kind in a manner which permits manufacture of furniture in a factory or which renders it possible for the amateur to assemble easily a piece of furniture which has been delivered as a mounting set. To provide a firm and play-free connection between the elements, these fittings are usually based on the fact that the necessary stability is obtained by the elements being tightened against one another at suitable engagement surfaces, and they often also presuppose that the elements are provided with guide pins and guide holes, respectively, in order to fit together in the correct manner. Connections which are based on assembly of the elements, require readjustment, however, on changes in temperature and climate, if they are to retain their stability, which is of course a disadvantage when it is a question of furniture in public places and garden furniture. In order to be able to be fitted discreetly in the furniture without disturbing the appearance thereof, the prior art fittings also are often of a construction which means that the fitting is expensive to manufacture.

With the object of providing a firm and reliable connection of the kind referred to above, which comprises a particularly simple and easily manufactured and therefore cheap fitting and moreover permits readjustment after the fitting is well and truly in place, such a connection according to the invention has obtained the characteristics appearing from claim 1.

Such a connection provides the following advantages over known connections of a similar type:

1. The mounting can easily be carried out by an amateur without using special tools.
2. The fitting included in the connection replaces glue and a centre pin in all furniture manufacture in the industry, which involves great advantages in storage and provides flexibility as far as manufacturing combinations and assembly in different dimensions are concerned.
3. The major part of the fitting is hidden in the connection; only end surfaces thereof are visible in a concealed place and moreover can easily be hidden by a suitable member.
4. The fitting consists of simple parts and can therefore be manufactured at a particularly low cost, estimated at only a quarter of the cost of the most similar fittings, and the working operations which have to be carried out on the elements to mount the fitting are of the simplest kind imaginable: only the drilling of a few holes is necessary.

Figure 2:
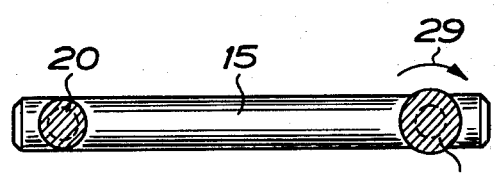
Figures 3, 4:
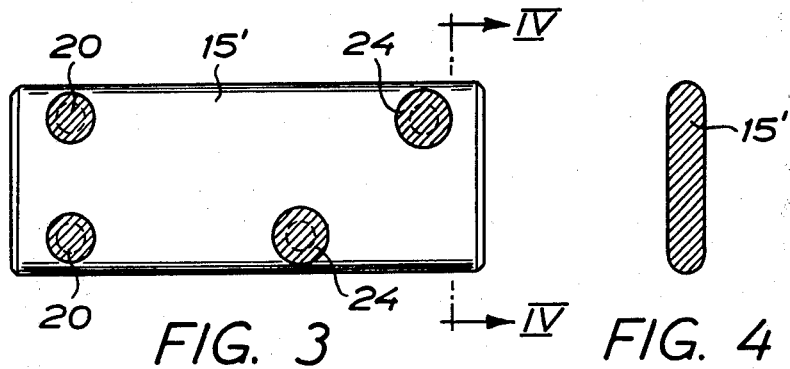
Figures 5, 6:
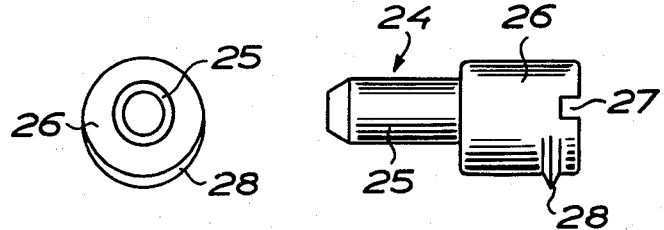

In order to illustrate the invention this will be described in more detail below with reference to the accompanying drawing in which FIG. 1 is a side view of a connection according to the invention with the two elements which are secured together by means of the connection shown in section, FIG. 2 is a sectional view of the connection, taken along line II—II in FIG. 1, FIG. 3 is a view corresponding to FIG. 2 in a modified embodiment of the connection, FIG. 4 is a cross-sectional view taken along line IV—IV in FIG. 3, FIG. 5 is a side view of an eccentric pin included in the connection, and FIG. 6 is an end view of the eccentric pin of FIG. 5, seen from the left in the last-mentioned figure.

FIG. 1 shows two elements 10 and 11 which are connected to one another by a connection according to the invention and may consist, for example, of a pair of wooden or wood-fibre parts of a piece of furniture. The element 10 has an edge surface which bears against a side surface on the element 11 in a butt joint 12. From the edge surface, a blind hole 13 is drilled perpendicularly into the element 10, and a blind hole 14 with a corresponding diameter is drilled into the element 11 from the side surface. The holes 13 and 14 are located in the respective elements such that the elements have the desired mutual position when the openings of the holes are in register and the holes lie substantially coaxially in line, and inserted therein is a rod 15, which may have a circular cross-section and may be cylindrical, as shown here (see also FIG. 2), but which may also have any other cross-sectional shape and can be constructed, for example, as shown in FIGS. 3 and 4, according to which the rod, designated 15' in FIGS. 3 and 4, has a substantially rectangular cross-sectional shape the longitudinal edges being rounded. Adjacent one end, the rod 15 has a through cylindrical bore 16 which extends perpendicularly through the rod, and adjacent the other end a through tapped bore 17 which also extends perpendicularly through the rod.

Drilled in the element 10 is a blind hole 18 which extends perpendicularly to the bore 13 receiving the rod 15 in this element, and in a corresponding manner a blind hole 19 is drilled in the element 11 perpendicularly to the blind hole 14 which receives the rod 15, the bores 16 and 17 in the rod 15 being disposed coaxially with the respective transverse blind holes 18 and 19. A rod 20 is introduced into the blind hole 19 and is screwed, with a threaded portion at one end, into the tapped bore 17 in the rod 15, while the rod 20 can have a screw-driver slit in the other end. Instead of the screw connection between the rods 15 and 20, the bore 17 may be a smooth cylindrical bore and the rod 20 can have an easy slide fit in the bore 17, while, on the other hand, it has a drive fit, preferably an easy drive fit, in the blind hole 19 in the element 11 to be held in the position shown by frictional grip. The length of the rod 20 is several times the cross-dimension (diameter) of the rod 15. In the rod 20 there is a through tapped bore 21 which is located coaxially with a blind hole 22 in the element 11, and a screw pin 23, which is received in the blind hole 22, is screwed into the bore 21. This screw pin 23 can be dispensed with, however, and it can also be replaced by a smooth pin which is held in position by a drive fit in the bore 21, which in this case is smooth and cylindrical, or in the blind hole 22. The pin can be constructed as an eccentric pin.

Introduced into the blind hole 18 in the element 10 is a pin 24 in the form of an eccentric pin of the construction seen in FIGS. 5 and 6. This eccentric pin has a cylindrical shank 25 and a cylindrical head 26 with a screw-driver slit 27, which is disposed eccentrically in relation to the shank. Extending over approximately half the periphery of the head 26 is a projecting sharp-edged chaser 28. The shank 25 is received for rotation in the cylindrical bore 16 in the rod 15, and the shank is introduced into the bore with the thicker portion of the head 26 to the right as seen in FIG. 1. By turning the eccentric pin 24 in clockwise direction, arrow 29 in FIG. 2, axial displacement of the rod 15 can then be effected towards the right as seen in FIG. 1, and as will easily be realized this means that the two elements 10 and 11 are pressed against one another in the butt joint 12. The chaser 28 cuts into the boundary wall of the blind hole 18 and so contributes to holding the eccentric pin 24 in position in the element 10.

The rods 15 and 20 with the pins 23 and 24 form an angle fitting which is received as a whole in the two elements 10 and 11 connected thereby, and is almost completely hidden in these. All that is seen of the fitting are the end surfaces of the rod 20 and the pins 23 and 24, which can easily be caused to meld into the rest of the furniture in an aesthetically pleasing manner, particularly if these parts are made of brass or are brown-anodized.

If the rod 15' is disposed in the elements 10 and 11, two rods 20 and two eccentric pins 24 can be arranged in the manner shown in FIG. 3.

It is clear that the fitting is of the simplest imaginable construction and that the mounting of the fitting can be effected in the simplest manner. After the holes have been drilled in the elements 10 and 11, the rods 15 and 20 forming the angle fitting can be placed in position joining the elements 10 and 11, after which the location of the fitting is effected by means of the pins 23 and 24 and any tightening of the elements 10 and 11 against one another which may be necessary is brought about by turning the eccentric pin 24.

The connection according to the invention is well suited for furniture of different kinds, including kitchen fixtures, wardrobes and garden furniture, as well as for household components which can be assembled, tube constructions for exhibitions and shop fixtures, sports stands and the like.

In the embodiment shown, the cross-rod 20 is screwed into the rod 15; instead, the rod 15 can be screwed or inserted into a cross-bore in the cross-rod 20. If the pin 23 is an eccentric pin, it can be constructed as shown in FIGS. 5 and 6.

What is claimed is:

1. A connector which tightly and adjustably fastening together first and second directly-abutting elements of wooden furniture, comprising a substantially straight rod having first and second transverse bores therethrough, one portion including the first transverse bore extending into a first passage in the first element, and another portion including the second transverse bore extending into a second passage in the second element; a cross rod extending through a cross passage in the first element with one end passing into the first transverse bore, thereby retaining the rod in position in the first passage; a cross pin having an eccentric rotatably received in a cross passage in the second element, the pin extending to the second transverse bore of the rod; the cross rod and the cross pin locking the rod into a position fastening the first and second elements together, and the cross pin and eccentric drawing the first and second elements tightly together in an engagement that is adjustable according to the rotated position of the eccentric in the cross passage.

2. A connector according to claim 1 in which at least one of the cross rod and cross pin respectively, and the first and second transverse bores in the rod, respectively, are threaded, and threadly engagement of the cross rod or cross pin with the rod.

3. A connector according to claim 1 in which the eccentric has a projecting chaser rotatably received in a cross passage in the second element, the chaser engaging the wall of the passage upon such rotation.

4. A connector according to claim 2 in which the chaser is sharp-edged, and cuts into the wall of the passage upon such rotation.

* * * * *